(12) United States Patent
Rademacher et al.

(10) Patent No.: US 9,631,113 B2
(45) Date of Patent: Apr. 25, 2017

(54) UV- AND THERMALLY CURING CLEARCOAT COMPOSITION FOR AUTOMOTIVE REFINISHING

(71) Applicant: BASF Coatings GmbH, Münster (DE)

(72) Inventors: Josef Rademacher, Münster (DE); Egbert Nienhaus, Ascheberg (DE); Sibylle Schöps, Münster (DE); Alexandra Steffens, Münster (DE)

(73) Assignee: BASF Coatings GmbH, Muenster (DE)

( * ) Notice: Subject to any disclaimer, the term of this patent is extended or adjusted under 35 U.S.C. 154(b) by 184 days.

(21) Appl. No.: 14/410,297

(22) PCT Filed: Jul. 4, 2013

(86) PCT No.: PCT/EP2013/064149
§ 371 (c)(1),
(2) Date: Dec. 22, 2014

(87) PCT Pub. No.: WO2014/006142
PCT Pub. Date: Jan. 9, 2014

(65) Prior Publication Data
US 2015/0322285 A1 Nov. 12, 2015

Related U.S. Application Data

(60) Provisional application No. 61/667,950, filed on Jul. 4, 2012.

(30) Foreign Application Priority Data

Jul. 4, 2012 (EP) .................................... 12174887

(51) Int. Cl.
| | | |
|---|---|---|
| *C09D 151/00* | (2006.01) | |
| *C09D 133/14* | (2006.01) | |
| *C08K 5/07* | (2006.01) | |
| *C08K 5/5397* | (2006.01) | |
| *C08G 18/62* | (2006.01) | |
| *C08G 18/72* | (2006.01) | |
| *C09D 175/16* | (2006.01) | |
| *C08K 5/52* | (2006.01) | |
| *C08K 5/5333* | (2006.01) | |
| *C08K 5/00* | (2006.01) | |

(52) U.S. Cl.
CPC ..... *C09D 151/003* (2013.01); *C08G 18/6229* (2013.01); *C08G 18/728* (2013.01); *C08K 5/07* (2013.01); *C08K 5/5205* (2013.01); *C08K 5/5333* (2013.01); *C08K 5/5397* (2013.01); *C09D 133/14* (2013.01); *C09D 175/16* (2013.01); *C08K 5/0025* (2013.01)

(58) Field of Classification Search
CPC C09D 151/003; C09D 133/08; C09D 133/14; C08G 18/6229
USPC ............... 522/90, 96, 97, 104, 100
See application file for complete search history.

(56) References Cited

U.S. PATENT DOCUMENTS

| | | | |
|---|---|---|---|
| 5,527,859 A | 6/1996 | Kempter | |
| 6,500,876 B2 * | 12/2002 | Weikard | ............... C08G 18/672 |
| | | | 522/174 |
| 7,064,165 B2 | 6/2006 | Baumgart et al. | |
| 8,808,805 B2 | 8/2014 | Groenewolt et al. | |
| 2003/0036604 A1 | 2/2003 | Meisenburg et al. | |
| 2008/0249250 A1 | 10/2008 | Rink | |

FOREIGN PATENT DOCUMENTS

| | | |
|---|---|---|
| DE | 102005033622 | 1/2007 |
| EP | 0188880 | 7/1986 |
| EP | 0650979 | 5/1995 |
| EP | 2592124 | 5/2013 |
| WO | WO-01/46286 | 6/2001 |
| WO | WO-03/000812 | 1/2003 |
| WO | WO-2009/077180 | 6/2009 |

OTHER PUBLICATIONS

PCT International Preliminary Report on Patentability in PCT/EP2013/064149, mailed Jan. 15, 2015, 4 pages.
PCT International Search Report in PCT/EP2013/064149, mailed Aug. 26, 2013, 2 pages.

* cited by examiner

*Primary Examiner* — Sanza McClendon
(74) *Attorney, Agent, or Firm* — Servilla Whitney LLC

(57) ABSTRACT

An UV- and thermally curable, solventborne clearcoat material suitable for automotive refinishing comprises:
- (A) at least one polyhydroxy-functional poly(meth)acrylate having grafted-on unsaturated (meth)acrylate side groups,
- (B) at least one polyisocyanate-functional, poly(meth)acrylate-functional aliphatic urethane,
- (C) at least one (meth)acrylate-functional aliphatic urethane free from isocyanate groups,
- (D) at least one hydroxy-functional, (meth)acrylate-functional aliphatic component free from isocyanate groups and from urethane groups and having a molecular weight of not more than 1000 g/mol and a (meth)acrylate functionality of at least 4,
- (E) at least one aliphatic polymercaptan,
- (F) at least one phosphoric acid or phosphonic acid blocked with an amine, the amine possessing a $pK_b$ of ≥3 and a boiling point under atmospheric pressure of >100° C., and
- (G) at least one photoinitiator selected from the group consisting of α-hydroxyalkyl phenyl ketones and monoacylphosphine oxides.

Component (A) may be an intermediate in the production of the clearcoat material.

19 Claims, No Drawings

UV- AND THERMALLY CURING CLEARCOAT COMPOSITION FOR AUTOMOTIVE REFINISHING

CROSS-REFERENCE TO RELATED APPLICATIONS

This application is the National Stage entry of PCT/EP2013/064149, filed on Jul. 4, 2013, which claims priority to European Application Number 12174887.5, filed on Jul. 4, 2012, and U.S. Ser. No. 61/667,950 filed on Jul. 4, 2012, which are incorporated herein by reference in their entireties.

The present invention relates to a UV-curable and thermally curable, solventborne clearcoat material, to a modular system for producing it, to a polyhydroxy-functional poly(meth)acrylate having grafted-on unsaturated (meth)acrylate side chains, which is used as principal binder in said modular system, and also to a method for producing an automotive refinish clearcoat system.

In vehicle repair paint shops there is a need for the provision of clearcoat materials which cure within a very short time to a state in which the painted bodywork or painted bodywork component is polishable. Since the substrates to be painted mostly possess three-dimensionally curved surfaces, the curing of the clearcoat materials to be used by means of UV-curing systems alone is often insufficient. In certain areas of the substrates, uniform irradiation is impossible to achieve, and so these areas cure slowly or not at all. To take account of this circumstance, paints known as dual-cure paints have been developed in various sectors of use, these being coating materials which are both radiation-curing and thermally curing.

EP 0188880 A2 describes, for example, coating material compositions for electrical circuits that cure in accordance with the dual-cure principle. These compositions comprise preferably 15 to 45 percent by weight of polyfunctional alkenes, 25 to 60 percent by weight of polyfunctional thiols, 10 to 50 percent by weight of polyfunctional isocyanates, and 0.5 to 2.5 percent by weight of photoinitiators. The requirements imposed on automotive finishes in particular, however, cannot be fulfilled by these formulations.

It was an object of the present invention to provide a clearcoat material which allows a drastic reduction in the waiting time in a vehicle repair paint shop after application until the finish becomes polishable, by comparison with conventional refinish clearcoat materials of the prior art, accompanied by a reduction in the thermal energy supply prior to polishability, on the basis of the shorter drying time. In association with rapid polishability, a particular objective, specifically including in shadow zones of the usually three-dimensional substrate to be painted, was to obtain rapid curing. A particular intention, through provision of a coating material of this kind, was to raise the productivity of the paint shop, to allow a greater number of vehicles to be painted within a shorter time. Furthermore, the clearcoat materials of the invention are to produce coating systems which possess high yellowing resistance.

The object has surprisingly been achieved through provision of a UV- and thermally curing, solventborne clearcoat material, comprising
(A) at least one polyhydroxy-functional poly(meth)acrylate having grafted-on unsaturated (meth)acrylate side groups,
(B) at least one polyisocyanate-functional aliphatic urethane containing at least two (meth)acrylate groups,
(C) at least one (meth)acrylate-functional aliphatic urethane free from isocyanate groups,
(D) at least one hydroxy-functional, (meth)acrylate-functional aliphatic component free from isocyanate groups and from urethane groups and having a molecular weight of not more than 1000 g/mol and a (meth)acrylate functionality of at least 4, more preferably 5 or 6,
(E) at least one aliphatic polymercaptan,
(F) at least one phosphoric acid or phosphonic acid blocked with an amine, the amine possessing a $pK_b$ of ≥3 and a boiling point under atmospheric pressure of >100° C., and
(G) at least one photoinitiator selected from the group consisting of α-hydroxyalkyl phenyl ketones and monoacylphosphine oxides.

When this specification uses the designation "(meth)acrylic", this designation stands both for "methacrylic" and for "acrylic". In connection with polymers, this means that the polymer is obtained from or comprises methacrylic-functional monomers, acrylic-functional monomers or both. "(Meth)acrylates" means "esters of (meth)acrylic acid".

Component (A)

The polyhydroxy-functional poly(meth)acrylate with grafted-on unsaturated (meth)acrylate side groups (A) is preferably a (meth)acrylate copolymer of
(a) one or more monounsaturated acrylate and/or methacrylate monomers and
(b) one or more monoethylenically unsaturated aromatic monomers,
where a portion of the (a) acrylate and/or methacrylate monomers carry hydroxyl groups and a further portion of the acrylate and/or methacrylate monomers carry epoxy groups, and where, after polymerization reaction has taken place, some or all, preferably all, of the epoxy groups are reacted with acrylic acid and/or methacrylic acid, with retention of the carbon-carbon double bonds in the acrylic acid and/or methacrylic acid. This results in polyhydroxy-functional (meth)acrylated poly(meth)acrylates (A) which carry (meth)acrylate side chains grafted on via an epoxy-carboxyl reaction on the poly(meth)acrylate main chain.

The main chain, constructed of the monomers (a), (b), and optionally further monoethylenically unsaturated monomers (c), comprises preferably at least 50% by weight of monomers (a), based on the total weight of the monomers which constitute the main chain, and preferably not more than 50% by weight of monomers (b), based on the total weight of the monomers which constitute the main chain. If there are further monoethylenically unsaturated monomers (c) present different from (a) and (b), their proportion is preferably less than 10% by weight, more preferably less than 5% by weight, based on the total weight of the monomers which constitute the main chain. Particularly preferred are those polyhydroxy-functional poly(meth)acrylates with grafted-on unsaturated (meth)acrylate side groups (A) whose main chain is composed of the monomers (a) and (b).

The fraction of the monomers (a) is more preferably 50% to 70% by weight, very preferably 55% to 65% by weight, based on the total weight of the monomers which constitute the main chain.

The fraction of the monomers (b) is more preferably 30% to 50% by weight, very preferably 35% to 45% by weight, based on the total weight of the monomers which constitute the main chain.

The monomers (a) consist of acrylate and/or methacrylate monomers, with the fraction of the acrylate monomers, based on the total weight of the monomers (a), being preferably 5% to 25% by weight, more preferably 10% to 22% by weight, and very preferably 15% to 20% by weight.

The fraction of the methacrylate monomers, based on the total weight of the monomers (a), is preferably 75% to 95% by weight, more preferably 78% to 90% by weight, and very preferably 80% to 85% by weight.

The fraction of the monomers (a) which carry hydroxyl groups, based on the total weight of the monomers (a), is preferably 5% to 25% by weight, more preferably 10% to 22% by weight, and very preferably 15% to 20% by weight.

Typical and preferred monomers (a), which carry neither hydroxyl groups nor glycidyl groups, are, for example, ($C_{1-8}$ alkyl) acrylates and ($C_{1-8}$ alkyl) methacrylates, more particularly ($C_{1-4}$ alkyl) acrylates and ($C_{1-4}$ alkyl) methacrylates such as methyl, ethyl, propyl, and butyl (meth)acrylates. As such monomers it is particularly preferred to use the methacrylates, with the use of methyl methacrylate and butyl methacrylate being especially preferred.

The monomers (a) which carry hydroxyl groups preferably comprise precisely one hydroxyl group per monomer. The hydroxyl groups may be present in the form of primary or secondary hydroxyl groups. The monomers (a) which carry hydroxyl groups are preferably hydroxyalkyl (meth)acrylates, such as, for example, hydroxy($C_{1-4}$ alkyl) acrylates and/or hydroxy($C_{1-4}$ alkyl) methacrylates. As monomers (a) which carry hydroxyl groups it is especially preferred to use acrylates. Particularly preferred among the latter are hydroxy($C_{1-4}$ alkyl) acrylates such as, for example, hydroxyethyl acrylate (HEA) or hydroxybutyl acrylate (HBA).

The fraction of the monomers (a) which carry a glycidyl group, based on the total weight of the monomers (a) is preferably 15% to 35% by weight, more preferably 20% to 30% by weight, and very preferably 22% to 28% by weight.

The monomers (a) which carry a glycidyl group contain preferably precisely one glycidyl group per monomer. The monomers (a) which carry glycidyl groups are preferably glycidyl acrylate or glycidyl methacrylate, the latter being used with particular preference.

As monomers (b), use is made of monoethylenically unsaturated aromatic monomers. In this case the ethylenically unsaturated group is preferably bonded directly to the aromatic radical. Monomers (b) used with preference are those of the general formula Ar—$CR^1$=$CR^2R^3$, where Ar is an aryl radical or heteroaryl radical having preferably 5 to 10 carbon atoms, and may be substituted or unsubstituted—that is, some of the hydrogen atoms may have been replaced by alkyl groups or other groups, such as sulfonic acid groups, for example, and their esters, phosphoric acid and its esters, and carboxyl groups and their esters or amides. Heteroatoms contemplated in the heteroaryl radical are more particularly N, O, and S. The radicals $R^1$, $R^2$, and $R^3$ may be identical to or different from one another and independently of one another are hydrogen or linear or branched alkyl groups having preferably 1 to 6, more preferably 1 to 4 carbon atoms. Very preferably the radicals $R^1$, $R^2$, and $R^3$ are hydrogen and Ar is a substituted or unsubstituted phenyl radical. A particularly preferred monomer (b) is styrene.

The construction of the main chain of the polyhydroxy-functional (meth)acrylated poly(meth)acrylate (A) from the monomers (a), (b), and optionally (c) takes place in a way which is known to a person of ordinary skill in the art. The polymerization of the monomers (a), (b), and optionally (c) takes place preferably in an organic solvent such as butyl acetate, for example, at elevated temperature such as, for example, 140 to 180° C., preferably 150 to 165° C., under an elevated pressure of, for example, 2 to 5 bar, preferably 3 to 4 bar, in the presence of an initiator, an example being a peroxide-based initiator such as di-tert-butyl peroxide or di-tert-amyl peroxide (DTAP).

Following production of the main chain of the polyhydroxy-functional poly(meth)acrylate with grafted-on unsaturated (meth)acrylate side groups (A), the glycidyl groups of the copolymerized monomers (a) which carry glycidyl groups are reacted with acrylic acid and/or methacrylic acid, preferably acrylic acid, with reaction of the COOH groups. It is preferred to react all of the glycidyl groups with acrylic acid and/or methacrylic acid, forming the polyhydroxy-functional poly(meth)acrylates with grafted-on unsaturated (meth)acrylate side groups (A). For this purpose it is advisable to use (meth)acrylic acid in an approximately identical stoichiometric quantity relative to the glycidyl groups of the main chain of the polymer. For this reaction as well, the customary conditions are known to a person of ordinary skill in the art. The reaction takes place preferably in solution, it being possible to use for example the same solvent as for preparing the main chain of the polymer. The reaction likewise takes place preferably at an elevated temperature such as, for example, 100 to 140° C. and is performed preferably in oxygen-depleted air, using catalysts such as, for example, zinc acetylacetonate, tin octanoate, dibutyltin oxide, and optionally antioxidants and inhibitors such as methylhydroquinone, for example, and those based on phosphite.

The polyhydroxy-functional poly(meth)acrylates with grafted-on unsaturated (meth)acrylate side groups (A) possess preferably a hydroxyl number in accordance with DIN EN ISO 4629 of 80 to 200 mg KOH/g, more preferably 80 to 150 mg KOH/g, and very preferably 90 to 120 g KOH/g. At hydroxyl numbers below 80 mg KOH/g, the mechanical properties deteriorate. If the hydroxyl numbers were to be too high, it would be necessary to use very large fractions of hydroxyl-carrying monomers, leading to restrictions on the glass transition temperature.

The acid number of the polyhydroxy-functional poly(meth)acrylates with grafted-on unsaturated (meth)acrylate side groups (A) is preferably 0 to 5 mg KOH/g. It can be determined in accordance with DIN EN ISO 2114. With particular preference, the polyhydroxy-functional poly(meth)acrylates with grafted-on unsaturated (meth)acrylate side groups (A) do not carry any acid groups.

The number-average molecular weight of the polyhydroxy-functional poly(meth)acrylates with grafted-on unsaturated (meth)acrylate side groups (A) is preferably 800 to 4000 g/mol, more preferably 1000 to 3000 g/mol, and very preferably 1000 to 2000 g/mol, determined by means of gel permeation chromatography (polystyrene standard). The weight-average molecular weight of the polyhydroxy-functional poly(meth)acrylates with grafted-on unsaturated (meth)acrylate side groups (A) is preferably 2000 to 8000 g/mol, more preferably 3000 to 6000 g/mol, and very preferably 3500 to 5500 g/mol, determined by means of gel permeation chromatography (polystyrene standard). If the molecular weight is too high, there is an increase in the viscosity of the polymer solution and of the completed paint solution, and the processing properties suffer. If the molecular weight is too low, drying and network-forming are adversely affected.

The double bond content is dependent typically on the fraction of the monomer (a) carrying epoxy groups in the main chain of the polymer, since this is the monomer via which the (meth)acrylic acid is introduced into the polymer. The weight percentage fraction of the $CH_2$=CH groups and $CH(CH_3)$=CH groups in the polyhydroxy-function poly(meth)acrylate with grafted-on unsaturated (meth)acrylate side groups (A) (also referred to below as double bond content) is preferably 1.5% to 8% by weight, more preferably 2% to 6% by weight, and very preferably 2% to 4% by weight, based on the additive overall weight of the monomers (a), (b), and optionally (c) used, including the (meth) acrylic acid used for grafting.

The glass transition temperature of the polyhydroxy-functional poly(meth)acrylate with grafted-on unsaturated (meth)acrylate side groups (A) is preferably at least −10° C., more preferably from 20° C. to 60° C., and very preferably from 30° C. to 40° C. The glass transition temperature can be measured on a sample prepared in accordance with DIN EN ISO 16805. The only difference from the cited DIN is that the substrate used was glass, the binder was knife-coated with a wet film thickness of 100 μm, and the applied coating was dried at 130° C. for 60 minutes. The actual measurement of the glass transition temperature takes place by means of differential scanning calorimetry (DSC) in accordance with ISO 11357-2, but at a heating rate of 10° C./min in deviation from the standard. In this case the sample is initially heated from −80° C. to +100° C. It is then cooled from +100° C. back down to −80° C. The measurement is made by again heating the sample from −80° C. to +120° C. The single heating and renewed cooling prior to the actual measurement run subjects the samples to a thermal pretreatment which has the effect of erasing their prior thermal "history". The glass transition temperature is evaluated using the point of inflection of the 3rd heat flux profile curve, as described in ISO 11357-2.

Particularly preferred as component (A) is a polyhydroxy-functional poly(meth)acrylate with grafted-on unsaturated (meth)acrylate side groups, which is a (meth)acrylate copolymer of (a) one or more monounsaturated acrylate and/or methacrylate-monomers and (b) one or more monoethylenically unsaturated aromatic monomers, where a portion of the monomers (a) carry hydroxyl groups and a further portion of the monomers (a) carry epoxy groups, and where, after polymerization reaction has taken place, some or all, preferably all, of the epoxy groups have been reacted with acrylic acid and/or methacrylic acid, with retention of the carbon-carbon double bonds in the acrylic acid and/or methacrylic acid, and where said copolymer possesses a. a hydroxyl number of 80 to 200 mg KOH/g
b. a double bond content of 1.5-8% by weight, and
c. a weight-average molecular weight $M_w$ of 2000-8000 g/mol.

The aforementioned particularly preferred component (A) is therefore, as an intermediate for producing the compositions of the invention, likewise provided by the present invention.

Component (B)

Component (B) is a polyisocyanate-functional aliphatic urethane comprising at least two (meth)acrylate groups. The parent structure is thus formed by an aliphatic organic monomer, oligomer or polymer comprising urethane structures. This component (B) comprises at least 2 isocyanate groups and at least 2 unsaturated (meth)acrylate groups. Component (B) comprises preferably 2 to 6, more preferably 2 to 4, and very preferably precisely 2 isocyanate groups, and independently thereof comprises 2 to 6, more preferably 2 to 4, and very preferably precisely 2 unsaturated (meth)acrylate groups.

In the jargon of a person of ordinary skill in the present art, component (B) may also be characterized as an isocyanate-functional urethane (meth)acrylate having at least two isocyanate groups and at least two (meth)acrylate groups. Component (B) is preferably an oligomer or polymer.

One example of a compound of this kind is the BASF SE product available under the trade name Laromer LR 9000, or Desmolux D100 from Bayer MaterialScience.

Component (C)

Component (C) is a (meth)acrylate-functional aliphatic urethane which is free from isocyanate groups. Component (C) differs from component (B) essentially in that component (C) contains no isocyanate groups, but instead only at least two (meth)acrylate groups, preferably 2 to 6 (meth) acrylate groups, more preferably 2 to 4 (meth)acrylate groups.

One example of a compound of this kind is the Bayer MaterialScience product available under the name trade Desmolux LP WDJ 3413.

Component (D)

Component (D) is a hydroxy-functional, (meth)acrylate-functional aliphatic component which is free from isocyanate groups and from urethane groups and has a molecular weight of not more than 1000 g/mol, preferably 400 to 600 g/mol, more preferably 500 to 530 g/mol. Since the compounds of component (D) are generally molecularly uniform compounds, the molecular weights do not represent average molecular weights, but instead actual molecular weights of the compounds. As a result of the absence of urethane groups, this component is already different from components (B) and (C). It differs from component (A) in that it is purely aliphatic and contains no aromatic structural units. Otherwise, component (D) also differs from component (A) in its low molecular weight. Furthermore, the parent structure of component (D) is not derived from a poly(meth) acrylate, but may instead be interpreted as a monomer or dimer.

Compounds of this kind used as component (D) are generally referred to, within the field of radiation-curing systems, as reactive diluents. A particular feature of component (D) is that as well as 4, more preferably 4 to 6, (meth)acrylate groups it also comprises at least one, preferably one or at most two, hydroxyl group(s).

Examples of compounds of this kind of component (D) are dipentaerythritol tetraacrylate and dipentaerythritol pentaacrylate, such as, for example, the commercial products Sartomer 399, Sartomer 399 LV, and Sartomer 444 D.

Component (E)

An aliphatic polymercaptan is used as component (E). This is preferably an aliphatic branched compound which in end positions has at least two, as for example 2 to 6, preferably at least three, and more preferably precisely three thiol groups. Examples of compounds suitable for constructing the framework of the aliphatic polymercaptan include monomeric polyols, such as, for example, glycerol, trimethylolpropane, pentaerythritol, dipentaerythritol, and neopentyl glycol, it also being possible for the polyols to be in mono- or polyalkoxylated form. Suitable alkoxylating agents are the known alkoxylating agents such as ethylene oxide, propylene oxide or butylene oxide, for example, but especially ethylene oxide. The thiol groups may be introduced at the end-positioned hydroxyl groups of the optionally alkoxylated polyol by means, for example, of esterification using mercaptopropionic acid.

Particularly preferred are aliphatic polymercaptans (E) which comprise polyethylene oxide units. Such polymercaptans (E) preferably possess a number-average molecular weight of 200 to 2500 g/mol, more preferably 400 to 1400 and very preferably 500 to 900 g/mol, such as 650 to 750 g/mol, for example.

It proves particularly apt to use, for example, ethoxylated trimethylolpropane which is esterified with three moles of mercaptopropionic acid and possesses a number-average molar mass of 650 to 750 g/mol. Compounds of this kind are available for example from Bruno Bock Chemische Fabrik GmbH & Co. KG under the trade name Thiocure®, such as, for example, Thiocure® ETTMP 700, Thiocure® ETTMP 1300, or Thiocure® PETMP.

Component (F)

Present mandatorily as component (F) is a phosphoric acid or phosphonic acid which is blocked with an amine, the amine possessing a $pK_b$ of ≥3 and a boiling point under atmospheric pressure of >100° C. Compounds of this kind are described in WO-A-2009/077180, for example.

Particularly preferred amines used are bicyclic amines such as, for example, triethylenediamine, and particularly preferred phosphoric esters used are dialkylphosphoric esters such as di(2-ethylhexyl)phosphoric acid, for example.

Component (G)

Use is made as component (G) of at least one photoinitiator selected from the group consisting of α-hydroxyalkyl phenyl ketones and monoacylphosphine oxides. It is preferred to use at least one photoinitiator from each of the aforementioned classes of compound.

A suitable commercial product already comprising a mixture of photoinitiators from both classes of compound is the Darocur 4265 available from BASF SE, for example. Also active is a mixture of Darocur TPO and Darocur 1173 in a mixing proportion other than 50:50% by weight as in Darocur 4265. Furthermore, it is also possible, for example, to use Irgacure 819 or Irgacure 184 or mixtures of the active species contained.

Another suitable class of photoinitiator compound is that of the α-alkoxyaryl phenyl ketones. An example of a typical representative of this class is Irgacure 651 from BASF SE.

As well as components (A), (B), (C), (D), (E), (F), and (G), the clearcoat composition of the invention may also comprise further components.

Since it is a solventborne clearcoat material, it comprises a solvent fraction of preferably about 30% to 50% by weight, more preferably 30% to 45% by weight, and very preferably 35% to 45% by weight, based on the total weight of the coating material composition. The solvents which can be used are different from the mandatorily included components (A) to (G). Components (A) to (G), however, may be present as preliminary solutions in solvents. Examples of suitable solvents are esters, such as butyl acetate or 1-methoxy-2-propyl acetate, ketones, such as methyl isobutyl ketone or methyl ethyl ketone, alcohols, such as isopropanol, ethers, such as butyl glycol, methoxypropanol, (alkyl) aromatics, such as, for example, xylene, mono-, di- or triethylbenzene, propyl- or isopropylbenzene, ethylmethylbenzene, aliphatic hydrocarbons, such as, for example, white spirit, and terpene-hydrocarbons, such as dipentenes, for example.

Other additives, included among neither the components (A) to (G) nor the solvents, are, for example, catalysts which catalyze a hydroxy-isocyanate reaction, such as tin-containing or bismuth-containing catalysts, for example. These include more particularly dibutyltin dilaurate or bismuth(3+) neodecanoate (for example, in Coscat® 83 from C. H. Erbslöh KG). The additional use of such catalysts is also advantageous in respect of through-volume drying at room temperature toward the end of the cure time. It also accelerates the after-reaction or consumptive reaction of the isocyanate, including its reaction with atmospheric moisture. The further additives also include, for example, surface-active agents, which provide, for example, for defoaming and/or effective flow. Such additives include, for example, high molecular mass, nonionic, silicone-free, surface-active agents, and also polyether-modified polydimethylsiloxanes.

The UV- and thermally curing, solventborne clearcoat material of the invention preferably comprises the following fractions of the components essential to the invention, based on the total weight of the clearcoat material:
15% to 33%, more preferably 20% to 30% by weight of component (A),
5% to 30%, more preferably 10 to 20% by weight of component (B),
1% to 9%, more preferably 2 to 8% by weight of component (C),
3% to 16%, more preferably 3 to 10% by weight of component (D),
0.5% to 25%, more preferably 1 to 15% by weight of component (E),
0.009% to 0.1%, more preferably 0.02% to 0.09% by weight of component (F), and
0.03% to 3.1%, more preferably 0.2% to 2% by weight of component (G).

These percent figures are always based on the active ingredient. Therefore, if one or more of components (A) to (G)—as described above—are to be used in the form of preliminary solvents, the solvents which do not fall within the definitions of (A) to (G) are not included in the percent fraction of the component in question.

In an especially preferred embodiment of the clearcoat material of the invention, it comprises:
23% to 28% by weight of component (A),
13% to 18% by weight of component (B),
3% to 8% by weight of component (C),
4% to 9% by weight of component (D),
3% to 7% by weight of component (E),
0.02% to 0.08% by weight of component (F), and
0.5% to 1.2% by weight of component (G).

It is advantageous to store components (A) to (G) separately, and to mix them not until immediately prior to application. Additionally provided by the present invention, accordingly, is a modular system for producing the clearcoat material of the invention, comprising a module (I) comprising (A), (C), (D), (F) and (G), a module (II) comprising components (E), and a module (III) comprising components (B).

The present invention also provides a method for producing a coating system, using the clearcoat material of the invention, said method comprising the steps of
(i) singly or repeatedly applying the clearcoat material of the invention to a precoated or uncoated substrate
(ii) irradiating the applied clearcoat film or films with UV radiation for a time of 3 to 10 minutes at a temperature between 10 and 120° C., preferably 10 and 80° C., more preferably between 15 and 35° C., and very preferably at room temperature (25° C.)
(iii) optionally subsequently polishing the irradiated and heat-treated and thus cured clearcoat film.

The distance between the radiation source and the substrate ought preferably to be between 0.5 and 3.5 m.

Examples of suitable radiation sources are those of the kind installed in the SE-QuickCure hand lamp form Sehon Innovative Lackieranlagen GmbH (Gechingen, Germany). On irradiation lines it is particularly preferred to use UV-A lamps which also emit a relatively small fraction of UV-B radiation in relation to UV-A radiation. Comparative trials with pure UV-A lamps have shown that a small fraction of UV-B radiation greatly promotes the rapid curing of the clearcoat materials of the invention.

Particularly suitable radiation sources have the following energy flux densities as measured from a distance of 200 cm:
Energy flux density of UV-A radiation (>315-380 nm): 500 to 1000 microwatts/cm$^2$
Energy flux density of UV-B radiation (>280-315 nm): 100 to 300 microwatts/cm$^2$
Energy flux density of UV-C radiation (200-280 nm): 0 to 100 microwatts/cm$^2$
Energy flux density of UV/Vis radiation (380-400 nm): 200 to 400 microwatts/cm$^2$.

Especially preferred radiation sources have the following energy flux densities as measured from a distance of 200 cm:
Energy flux density of UV-A radiation (>315-380 nm): 730 microwatts/cm$^2$
Energy flux density of UV-B radiation (>280-315 nm): 210 microwatts/cm$^2$
Energy flux density of UV-C radiation (200-280 nm): 60 microwatts/cm$^2$
Energy flux density of UV/Vis radiation (380-400 nm): 310 microwatts/cm$^2$.

The energy flux densities of radiation sources can be determined by means of a photodiode array spectrometer MS126 L.O.T (measurement temperature: compensated to 0° C.; measurement grating: model 77413 (line density 600 l/mm); measurement range 200-400 nm (exposure for 0.1 s), fixed slot: 25 micrometers+3 mm (over 1 m waveguide); measurement distance 200 cm). In this way it is possible in a simple way to select particularly suitable radiation sources.

The clearcoat materials of the invention can be employed wherever there is a requirement for clearcoat systems which are intended to cure rapidly and preferably at room temperature. They are preferably used in applications where rapid polishability is a requirement. Their use particularly in the case of curved substrate is advantageous, such substrates being present typically, for example, in the context of automotive refinish.

The aim of the text below is to illustrate the invention by reference to examples.

EXAMPLES

Example A

Preparation of Component (A)

In a first step a glycidyl-functionalized copolymer was prepared. This was done by introducing 1165.6 g of butyl acetate into a standard stirring vessel and heating it to 164° C. under a nitrogen atmosphere at 3.5 bar. A mixture of 14 g of butyl acetate and 81.8 g of DTAP peroxide was added dropwise over the course of 15 minutes. 15 minutes later the dropwise addition of a mixture of 720.6 g of styrene, 394.7 g of methyl methacrylate, 171.6 g of butyl methacrylate, 103 g of hydroxyethyl acrylate, 68.6 g of hydroxybutyl acrylate and 257.4 g of glycidyl methacrylate was commenced, this mixture being metered in at a uniform rate over 4×60 minutes. Further initiator was metered in after 30 minutes, giving a total initiator feed time of 285 minutes. After the end of the metered addition, stirring was continued for 1 hour more at 150° C. and 3.5 bar. The result was a polymer solution having a solids content of 57.9% by weight (on drying for 1 hour at 130° C.) and a viscosity at 23° C. of 253 mPas at 750 revolutions per minute using spindle 3 (Brookfield CAP cone/plate viscosimeter; the samples were temperature-conditioned for 10 seconds beforehand, and the measurement was carried out over a period of 30 seconds, with the reading after 30 seconds being the measurement value reported).

In a second step, 62.2 g of acrylic acid was metered in over the course of 1 hour to a mixture of 1478.1 g of the polymer solution obtained in the first step, 0.92 g of zinc acetylacetonate (0.1% by weight based on solids), 0.6 g of Doverphos S 9228 (0.065% by weight based on solids) and 0.3 g of methylhydroquinone (0.04% by weight based on solids) under lean air at 120° C. The mixture was held at 120° C. until the acid number fell below a level of 2 mg KOH/g. The result was a clear, 61.8% strength by weight polymer solution of component (A), the polymer possessing an OH number of 97 mg KOH/g, a weight-average molecular weight of 4485 g/mol, a number-average molecular weight of 1618 g/mol, and a double bond content of 2.65% by weight, based on the total weight of the monomers incorporated in the polymer, including the grafted-on acrylic acid. The polymer possesses a glass transition temperature of 35° C. as measured by differential scanning calorimetry (DSC) with a heating rate of 10° C./min (sample preparation as per DIN EN ISO 16805, with a glass plate as substrate and a sample applied by knife coating: 100 micrometers, dried at 130° C. for 60 minutes) and a Gardner color number of 0.5 (in accordance with DIN EN ISO 4630-2).

Example B

Preparation of an Inventive Clearcoat Material Using Component (A) from Example A A millbase module (I), comprising components (A), (C), (D), (F), and (G), a standardizing additive module (II), comprising component (E), and a curing agent module (III), comprising component (B), were produced. The compositions of each of the modules can be seen from Table 1. Shortly before application, the modules (I), (II), and (III) were mixed with one another to form the inventive clearcoat material.

TABLE 1

| Module | Amount used in parts by weight per 100 parts by weight of clearcoat material |
|---|---|
| Millbase module (I) | |
| Component (A) from Example A (61.8% strength by weight) | 41.74 |
| Component (C)[1] | 9.21 |
| Component (D)[2] | 6.14 |
| Component (F)[3] | 0.09 |
| Component (G)[4] | 0.77 |
| Flow control agent[5] | 0.24 |
| Light stabilizers[6] | 1.1 |
| Dibutyltin dilaurate | 0.09 |
| Additive solvents[7] | 2.0 |
| Standardizing module (II) | |
| Component (E)[8] | 4.51 |
| Defoamer/Flow control agent[9] | 0.27 |
| Standardizing additive[10] | 13.24 |
| Curing agent module (III) | |
| Component (B)[11] | 15.45 |
| Butyl acetate | 5.15 |
| (I) + (II) + (III) | 100.00 |

[1]Unsaturated aliphatic urethane acrylate (58% in butyl acetate)
[2]Dipentaerythritol pentaacrylate (100% form)
[3]Di-(C$_8$ alkyl ester) of phosphoric acid, blocked with triethylenediamine (50% in isopropanol)
[4]Photoinitiator mixture of an α-hydroxyalkyl phenyl ketone and a monoacyl- phosphine oxide
[5]Mixture of two polyether-modified polydimethylsiloxanes (56%)
[6]Mixture of two light stabilizers
[7]Mixture of butyl acetate and methyl isobutyl ketone
[8]Ethoxylated trimethylpropane tri(3-mercaptopropionate); $M_n$ = 708 g/mol; Functionality: 3
[9]Silicone-free, nonionic, high molecular mass defoamer/flow control agent (50%)
[10]Glassodur standardizing additive, containing about 22.5% alkylbenzenes and about 77.5% different acetic esters (product of BASF Coatings GmbH)
[11]Aliphatic urethane acrylate formed from hydroxyethyl acrylate and hexamethylene diisocyanate oligomers Polishability:

To investigate the polishability of the inventive clearcoat material, it is applied to a DIN A4 steel panel already coated with a 2-component PU primer-surfacer and a waterborne basecoat material. Application took place in two spray passes with a 1-minute intermediate flash-off time and a 5-minute final flash-off time in the spray booth. Drying took place over a time of 9 minutes under UV irradiation from a distance of 180 cm from angle of 90° to the panel, with a temperature of 23° C. and an atmospheric humidity of 50% (+−5%). The characteristics of the UV radiation source are as follows (determined using Belt Radiometer ILT 390 C):

| Distance in cm | Dose in mJ/cm$^2$ |
|---|---|
| 50 | 18742 |
| 100 | 5731 |
| 180 | 1662 |
| 200 | 1437 |

The measurement range of the instrument is located between 225 and 425 nm.

After drying, the inventive UV clearcoat material was matted in the middle of the test panel over an area of approximately 10×10 cm, using a Festo eccentric sanding machine and P2000 abrasive paper from 3M. It was subsequently polished up with a polishing machine (from Rupes) in the following 2 stages:

In the first stage, polishing foam (pimpled) was used along with 3M Plus Abrasive Paste for 30 seconds for polishing. The second polishing stage used a polishing pad along with a high-gloss machine polish from 3M, again for 30 seconds.

Immediately thereafter the polished surface was inspected for the following parameters:
1. Abrasion scars in daylight
2. Gloss (to DIN EN ISO 2813; measured at the receiver aperture angle of 20°)
3. Shade shift (visual in daylight) and
4. Marginal zones (visibility of marginal zones around the polished site)

Drying Recorder

In accordance with ASTM D 5895-03 (Reapproved 2008)

For assessment using the drying recorder, glass strips were painted using a Sata RP 1.3 NR gravity-fed cup gun in 2 spray passes (resulting in a dry film thickness of 40-45 μm). There was a 1-minute flash-off between the spray passes. Subsequently, over a test duration of 12 hours at 23° C. and 50% relative humidity, determinations were made, by analogy with ASTM D 5895-03, of the set-to-touch time, tack-free time, dry-hard time and dry-through time.

Type: The B.K. Drying Recorder
Company: The Mickle Laboratory Engineering Co. Ltd GB Sample Preparation:
Substrate material: Glass strips
Spray gun: Sata RP 1.3 NR gun, used as per technical information sheet
Spray passes: 2
Intermediate flash-off time: 1 minute
Test duration: 12 hours
Temperature: 23° C.
Atmospheric humidity: 50%
Dry film thickness: 40-45 μm The color numbers were determined in accordance with DIN EN ISO 4630-2, using a Dr. Lange LICO 200 instrument for color number determination.

| Millbase module | Millbase 1 (inventive) | Millbase C1 (comparative) | Millbase C2 (comparative) | Millbase C3 (comparative) |
|---|---|---|---|---|
| Component (A)[a] | | | 65 | 65 |
| Component (A) from Example A | 68 | | | |
| Component (C)[b] | 15 | | | |
| Component (D)[c] | 10 | 24 | | 24 |
| Component (F)[d] | 0.15 | | | |
| Component (G)[e] | 1.25 | 1.5 | 1.5 | 1.5 |
| Flow control agent[f] | 0.4 | 0.4 | 0.4 | 0.4 |
| Defoamer/Leveling agent[g] | | | 0.5 | 0.5 |
| Light stabilizers[h] | 1.8 | 1.8 | 1.8 | 1.8 |
| Dibutyltin dilaurate | 0.15 | 0.15 | 0.15 | 0.15 |
| Butyl acetate | 1.25 | 6.15 | 2.65 | 2.65 |
| Methyl isobutyl ketone | 2 | 4 | 4 | 4 |
| Triallyl isocyanurate | | 62 | 24 | |

| Standardizing additive module | Standardizing additive 1 | Standardizing additive 2 |
|---|---|---|
| Standardizing additive[i] | 73.50 | 65.000 |
| Component (E)[j] | | 35.000 |
| Component (E)[k] | 25.00 | |
| Defoamer/Flow control agent[g] | 1.50 | |

| Curing agent module | Curing agent 1 | Curing agent C1 |
|---|---|---|
| Component (B)[l] | 75.00 | |
| Butyl acetate | 25.00 | |
| TDI-based polyisocyanate (75% in butyl acetate) 13.3% NCO content | | 100 |

[a]Parocryl VP 56017 (a polyhydroxy-functionalized poly(meth)acrylate with grafted-on unsaturated (meth)acrylate sidegroups)
[b]Unsaturated aliphatic urethane acrylate (58% in butyl acetate)
[c]Dipentaerythritol pentaacrylate (100% form)
[d]Di-($C_8$ alkyl ester) of phosphoric acid, blocked with triethylene diamine (50% in isopropanol)
[e]Photoinitiator mixture of an α-hydroxyalkyl phenyl ketone and a monoacyl-phosphine oxide
[f]Mixture of two polyether-modified polydimethylsiloxanes (56%)
[g]Silicone-free, nonionic, high molecular mass defoamer/flow control agent (50%)
[h]Mixture of two light stabilizers
[i]Glassodur standardizing additive, containing about 22.5% alkylbenzenes and about 77.5% different acetic esters (product of BASF Coatings GmbH)
[j]Pentaerythritol tetra(3-mercaptopropionate) Functionality: 4
[k]Ethoxylated trimethylpropane tri(3-mercaptopropionate); $M_n$ = 708 g/mol; Functionality: 3
[l]Aliphatic urethane acrylate made from hydroxyethyl acrylate and hexamethylene diisocyanate oligomers

| Modules | Parts by volume | Example 1 | Example C1 | Example C2 | Example C3 | Example C4 | Example C5 |
|---|---|---|---|---|---|---|---|
| Working examples | | | | | | | |
| Millbase | 3 | Millbase 1 | Millbase C1 | Millbase C2 | Millbase C3 | Millbase C1 | Millbase C3 |
| Curing agent | 1 | Curing agent 1 | Curing agent 1 | Curing agent 1 | Curing agent C1 | Curing agent C1 | Curing agent 1 |
| Standardizing additive | 1 | Standardizing additive 1 | Standardizing additive 2 | Standardizing additive 2 | Standardizing additive 2 | Standardizing additive 2 | Standardizing additive 2 |
| Drying at room temperature | | Example 1 | Example C1 | Example C2 | Example C3 | Example C4 | Example C5 |
| Drying Recorder 12 h | | | | | | | |
| Set-to-touch time after start in h | | 0.25 | 2 | 0.5 | 0.5 | 12 | 1 |
| Tack-free time after start in h | | 0.75 | 12 | 2 | 1 | | 2 |
| Dry-hard time after start in h | | 1.25 | | 6.5 | 2 | | 7 |
| Dry-through time after start in h | | 1.5 | | 11 | 7 | | 11.5 |
| Notes/Assessment: Drying at room temperature after 24h | | dry, firm to touch, good topcoat hold down | no drying, wet clearcoat | very sticky, pinholes | dry, firm to touch, pinholes, blushing | no drying, wet clearcoat | sticky surface, fine pinholes |
| Polishability | | | | | | | |
| 1. Abrasion scars in daylight | | none | visible | visible | visible | visible | none |
| 2. Gloss (to DIN EN ISO 2813; measured at the receiver aperture angle of 20°) | | 89 | 75 | 80 | 78 | 73 | 89 |
| 3. Shade shift (visual in daylight) | | none | distinct | slight | severe | severe | none |
| 4. Marginal zones (visibility of marginal zones around the polished site) | | none | visible | visible | visible | visible | slight marking |

The invention claimed is:

1. An UV- and thermally curable, solventborne clearcoat material comprising
   (A) at least one polyhydroxy-functional poly(meth)acrylate having grafted-on unsaturated (meth)acrylate side groups,
   (B) at least one polyisocyanate-functional aliphatic urethane containing at least two (meth)acrylate groups,
   (C) at least one (meth)acrylate-functional aliphatic urethane free from isocyanate groups,
   (D) at least one hydroxy-functional, (meth)acrylate-functional aliphatic component free from isocyanate groups and from urethane groups and having a molecular weight of not more than 1000 g/mol and a (meth)acrylate functionality of at least 4,
   (E) at least one aliphatic polymercaptan,
   (F) at least one phosphoric acid or phosphonic acid blocked with an amine, the amine possessing a pKb of ≥3 and a boiling point under atmospheric pressure of >100° C., and
   (G) at least one photoinitiator selected from the group consisting of α hydroxyalkyl phenyl ketones and monoacylphosphine oxides.

2. The UV- and thermally curable, solventborne clearcoat material according to claim 1, wherein component (A) is a (meth)acrylate copolymer of:
   (a) one or more monounsaturated acrylate and/or methacrylate monomers,
   (b) one or more monoethylenically unsaturated aromatic monomers, and optionally
   (c) one or more ethylenically unsaturated monomers different from (a) and (b), where a portion of the monomers (a) carry hydroxyl groups and a further portion of the monomers (a) carry epoxy groups, and where, after polymerization reaction has taken place, some or all, preferably all, of the epoxy groups have been reacted with acrylic acid and/or methacrylic acid, with retention of the carbon-carbon double bonds in the acrylic acid and/or methacrylic acid.

3. The UV- and thermally curable, solventborne clearcoat material according to claim 2,
   wherein the fraction of the monomers (a) is 50% to 70% by weight and the fraction of the monomers (b) is 30% to 50% by weight, based in each case on the total weight of the monomers constituting the main chain.

4. The UV- and thermally curable, solventborne clearcoat material according to claim 1,
   wherein the glass transition temperature of (A) is at least −10° C., preferably 20 to 60° C.

5. The UV- and thermally curable, solventborne clearcoat material according to claim 1,
   wherein (B) contains 2 to 6 unsaturated (meth)acrylate groups.

6. The UV- and thermally curable, solventborne clearcoat material according to claim 1,
   characterized in that (C) contains 2 to 6 unsaturated (meth)acrylate groups.

7. The UV- and thermally curable, solventborne clearcoat material according to claim 1, wherein (D) is selected from the group consisting of dipentaerythritol tetraacrylate and dipentaerythritol pentaacrylate.

8. The UV- and thermally curable, solventborne clearcoat material according to claim 7,
   wherein (D) is dipentaerythritol pentaacrylate.

9. The UV- and thermally curable, solventborne clearcoat material according to claim 1, wherein the aliphatic polymercaptan (E) is mono- or polyalkoxylated, has a number-average molecular weight of 200 to 2500 g/mol, and contains 2 to 6 thiol groups.

10. The UV- and thermally curable, solventborne clearcoat material according to claim 1, wherein the amine of component (F) is triethylenediamine and the phosphoric acid is a di(2-ethylhexyl)phosphoric acid.

11. The UV- and thermally curable, solventborne clearcoat material according to claim 1, wherein the photoinitiator (G) comprises an α hydroxyalkyl phenyl ketone and a monoacylphosphine oxide.

12. The UV- and thermally curable, solventborne clearcoat material according to claim 1, wherein:
    component (A) is a (meth)acrylate copolymer of:
        (a) one or more monounsaturated acrylate and/or methacrylate monomers,
        (b) one or more monoethylenically unsaturated aromatic monomers, and optionally
        (c) one or more ethylenically unsaturated monomers different from (a) and (b), where a portion of the monomers (a) carry hydroxyl groups and a further portion of the monomers (a) carry epoxy groups, and where, after the polymerization reaction has taken place, some or all, preferably all, of the epoxy groups have been reacted with acrylic acid and/or methacrylic acid, with retention of the carbon-carbon double bonds in the acrylic acid and/or methacrylic acid,
    components (B) and (C) each contain 2 to 6 unsaturated (meth)acrylate groups,
    component (D) is selected from the group consisting of dipentaerythritol tetraacrylate and dipentaerythritol pentaacrylate,
    component (E) is mono- or polyalkoxylated, has a number-average molecular weight of 200 to 2500 g/mol, and contains 2 to 6, preferably 3, thiol groups, and
    component (G) comprises an α-hydroxyalkyl phenyl ketone and a monoacylphosphine oxide.

13. The UV- and thermally curable, solventborne clearcoat material according to claim 1 comprising:
    15% to 33% by weight of component (A),
    5% to 30% by weight of component (B),
    1% to 9% by weight of component (C),
    3% to 16% by weight of component (D),
    0.5% to 25% by weight of component (E),
    0.009% to 0.1% by weight of component (F), and
    0.03% to 3.1% by weight of component (G), based in each case on the total weight of the clearcoat material.

14. A modular system for producing the UV- and thermally curable, solvent-based clearcoat material according claim 1, comprising:
    a module (I) comprising components (A), (C), (D), (F), and (G),
    a module (II) comprising component (E), and
    a module (III) comprising component (B).

15. A method for producing a coating system comprising
    (i) singly or repeatedly applying the clearcoat material of claim 1 to a precoated or uncoated substrate;
    (ii) irradiating the applied clearcoat film or films with UV radiation for a time of 3 to 10 minutes at a temperature between 10 and 120° C.;
    (iii) optionally subsequently polishing the irradiated and heat-treated and thus cured clearcoat film.

16. The method for producing a coating system according to claim 15, where the UV radiation possesses a fraction of UV-A radiation and a fraction of UV-B radiation, and the fraction of UV-B radiation is smaller than the fraction of UV A radiation.

17. The method for producing a coating system according to claim 15, wherein the energy flux density of the UV-A radiation is 500 to 1000 microwatts/cm$^2$ as measured from a distance of 200 cm, and the energy flux density of the UV-B radiation is 100 to 300 microwatts/cm$^2$ as measured from a distance of 200 cm.

18. The method of claim 15, wherein the substrate is a curved substrate.

19. The method of claim 15, wherein the substrate is an automotive substrate.

* * * * *